F. LITTMANN
Apparatus for Preparing Water for Ice-Machines.
No. 214,161. Patented April 8, 1879.
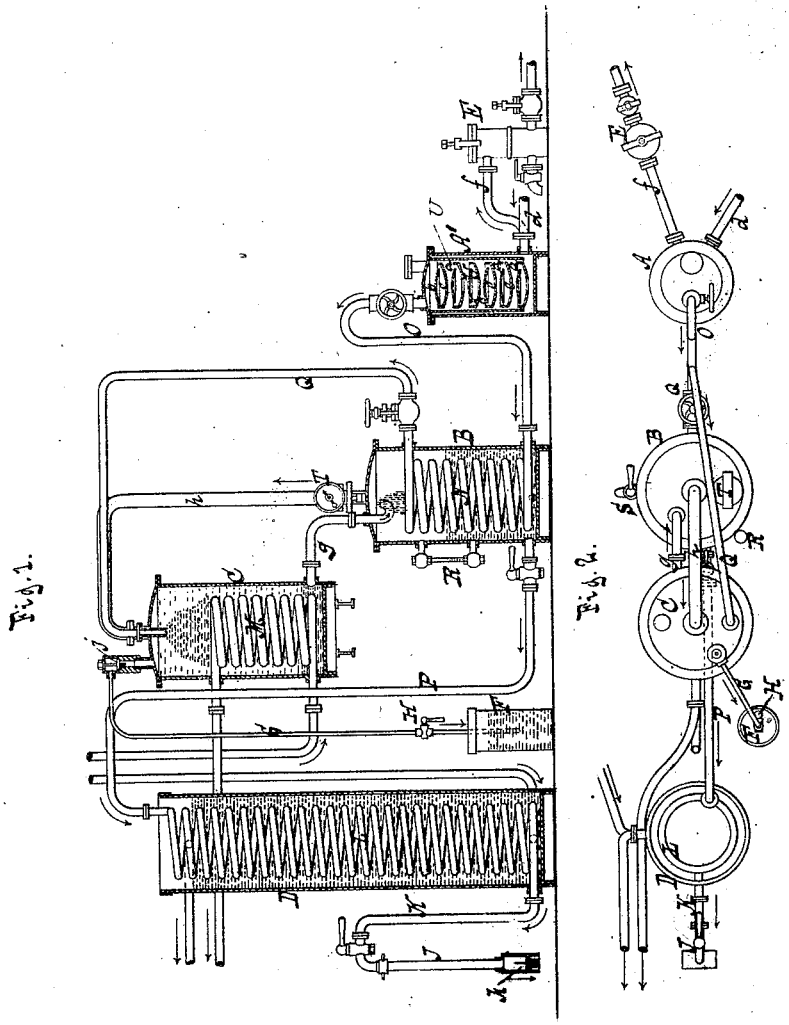
Witnesses
Otto Hupeland
William Miller
Inventor
Franz Littmann
by
Van Santvoord & Hauff
his attorneys

UNITED STATES PATENT OFFICE.

FRANZ LITTMANN, OF HALLE A. SAALE, GERMANY.

IMPROVEMENT IN APPARATUS FOR PREPARING WATER FOR ICE-MACHINES.

Specification forming part of Letters Patent No. 214,161, dated April 8, 1879; application filed February 12, 1879.

*To all whom it may concern:*

Be it known that I, FRANZ LITTMANN, of Halle a. Saale, Empire of Germany, have invented a Process and Apparatus for Preparing Water for Ice-Machines, which invention is fully set forth in the following specification, reference being had to the accompanying drawings, in which—

Figure 1 represents a vertical central section. Fig. 2 is a plan view.

Similar letters indicate corresponding parts.

This invention consists in the combination, in an apparatus for preparing water for ice-machines, of a cleaning-cylinder, a heating-cylinder, a condensing-cylinder, and a cooling-cylinder, as will be hereinafter more fully described; also, in the combination, with an apparatus, as before set forth, of a cylinder for leading the water and other impurities from the steam-cleaning cylinder; also, in the process of preparing water for ice-machines by cleaning and condensing steam and then heating the water resulting therefrom, by means of the succeeding current of steam, to drive off any remaining air, as will be hereinafter more fully set forth.

In freezing ordinary water in ice-machines, as is done at present, the ice which results therefrom is white and snowy. The cause of this is the air which is contained in the water thus frozen. I have constructed this apparatus in order to thoroughly free the water from air, and also to cool the water sufficiently that it can be employed in the manufacture of ice, and the ice so obtained will be clear and transparent when produced by ice-machines of any kind.

In the drawings, the letter A designates the steam-cleaning cylinder, into which steam is led by means of the tube or pipe $d$. This steam-cleaning cylinder consists of the outer cylinder, A', and an inner cylinder, U, which is suspended inside the first. This cylinder U is provided, in its interior, with cup-shaped plates or disks $a$ $b$, which are placed in pairs throughout its length. Each pair consists of two disks, which are so placed that their concavities face each other. The disks $a$, which have their concave sides turned upward, fit closely into the cylinder U, and are perforated in their centers with openings $e$, through which the steam passes. The cylinder A' is closed at the top, and the steam passes off through the tube or tubes O.

In passing through the openings $e$ in the disks $a$, any water and impurities that may have been carried over with the steam from the boiler are caught by the disks $b$, which sit over the tops of the disks $a$ and fall to the bottom of the cylinder A'. This water, together with the impurities, flows through the tube $f$ into the cylinder E, whence it is let off. The tube $f$ is curved upward, as shown in the drawings, so that some water always remains in the bottom of the cylinder A', thus closing the mouth of the tube $f$, and preventing the steam from flowing out through said tube. The steam from the cleaning-cylinder then passes through the worm N in the heating-cylinder B, and from thence, through the tube or pipe Q, into the condensing-cylinder C. Here the steam is condensed by coming in contact with the worm M, through which cold water is kept continually flowing. The water or condensed steam then flows back, through the tube $g$, into the heating-cylinder B. Here the water or condensed steam is caused to boil by the steam passing through the worm or coil N. By this process any additional air which may remain in the condensed water is driven off.

This heating-cylinder B is provided with a water-glass, R, to indicate the level of the water, and also with a manometer, T, for indicating the pressure in said cylinder. Any air and steam which may collect in the top of said heating-cylinder B pass off into the condensing-cylinder C, through the tube $h$. The water in the heating-cylinder B is caused to boil by the steam in the coil or worm N, and is then forced over, through the tube P, into the worm L, which occupies the interior of the cooling-cylinder D. This cooling-cylinder D is always supplied with ice or cold water. The water from the heating-cylinder B, after being thus cooled, is drawn off, through the tube K, into boxes or cans or other suitable receptacles, and is then subjected to the action of an ice-machine.

In the top of the condensing-cylinder C is a tube, G, for leading off any steam and air in the top of said cylinder. This tube is provided with a spring-valve, $j$, which is opened by the pressure in the cylinder C, and allows the air and steam to flow out. If the pressure diminishes the valve $j$ closes, and no air can enter the cylinder through the tube G. The rapidity of the outflow of steam and air can be regulated by the stop-cock H. The mouth of said tube G may dip under water in the receptacle F, thus further preventing the entrance of air, and also for indicating the amount of air which flows out through said tube by the bubbles rising to the surface.

To regulate the operation of the whole apparatus, the connecting tubes O, Q, and P are all provided with stop-cocks, as shown in the drawings. Should too much water accumulate in the heating-cylinder B, it can be drawn off through the stop-cock S.

After being cooled in the cylinder D, the water is drawn off through the tube K, which is provided with a stop-cock, as shown in the drawings. To this tube K there may be attached a flexible hose or tube, J, as shown in the drawings. This hose I provide with a valve, $k$. I prefer to use a floating valve for this purpose, so that when the water flows out through the hose J this valve $k$ will be open. As soon as the flow diminishes, the valve sinks down and closes the mouth of the hose J, thus preventing any air from entering the hose J or tube K.

As will be seen, I obtain by means of this apparatus water which is perfectly free from air. When this water is frozen in any ice-machine, the ice so obtained is perfectly clear and transparent, and not white and snowy, as is the case at present. I thus obtain ice which can be more readily sold than the ice which is at present manufactured.

What I claim as new, and desire to secure by Letters Patent, is—

1. The combination, in an apparatus for preparing water for ice-machines, of a cleaning-cylinder, A, a heating-cylinder, B, a condensing-cylinder, C, and a cooling-cylinder, D, all combined and operating substantially as set forth.

2. The combination, in an apparatus for preparing water for ice-machines, of a cleaning-cylinder, A, a heating-cylinder, B, a condensing-cylinder, C, a cooling-cylinder, D, and a cylinder, E, for removing the water and impurities from the cleaning-cylinder, all combined and operating substantially in the manner and for the purpose set forth.

3. The above-described process of preparing water for ice-machines by converting the same into steam, freeing said steam from impurities, then condensing the steam, and finally heating the water resulting from such condensation, by means of a succeeding current of steam, to drive off any remaining air, substantially as herein described.

In testimony whereof I have hereunto set my hand and seal this 13th day of January, 1879.

FRANZ LITTMANN. [L. S.]

Witnesses:
 JOHN BACHE,
 MAX RICHTER.